June 30, 1953 P. R. BELL, JR 2,644,083

INSTANTANEOUS AUTOMATIC GAIN CONTROL CIRCUIT

Filed Feb. 27, 1945

INVENTOR.
PERSA R. BELL, JR.
BY
William D. Hall.
ATTORNEY

Patented June 30, 1953 2,644,083

UNITED STATES PATENT OFFICE 2,644,083

INSTANTANEOUS AUTOMATIC GAIN CONTROL CIRCUIT

Persa R. Bell, Jr., Cambridge, Mass., assignor, by mesne assignments, to the United States of America as represented by the Secretary of War Application February 27, 1945, Serial No. 580,019

5 Claims. (Cl. 250—20)

The present invention pertains generally to automatic volume controls for radio receivers and more particularly to such controls as applied to the pulse receiver in a pulse-echo type of radio object-locating system.

In pulse-echo object-locating systems wherein an exploratory, pulsed radio beam is transmitted, reflected by a target, and intercepted by a pulse receiver, a serious difficulty arises when strong interfering signals tend to obscure the target echo signal, as may occur, for example, if the beam scans a target disposed within a large bank of clouds or against a background of reflecting ground objects. In such a case the echo signals reflected by the interfering objects may be of such great intensity as to saturate the amplifier stages and block the receiver. Inasmuch as the echo signals from the target are superimposed over the interfering signals, the response of the receiver may well go beyond the saturation point with the result that the combined signals cannot be separately observed on the indicator associated with the receiver. Accordingly, under such circumstances, the indicator will display a broad echo signal without revealing the specific location of the target.

It is, therefore, a primary object of the present invention to obviate the above-mentioned difficulty by providing an automatic volume control circuit which rapidly corrects the bias of a receiver channel when strong and undesired signals are received, such volume control circuit having an extremely fast recovery time.

It is another object of this invention to provide, in conjunction with a receiver employed in a pulse-echo radio object-locating system, an automatic volume control which enables the system to distinguish between target echoes and relatively strong interfering echoes that are received concurrently therewith.

A further object of this invention is to afford an automatic volume control of the above type protecting a plurality of receiver stages from being blocked.

Figure 1:
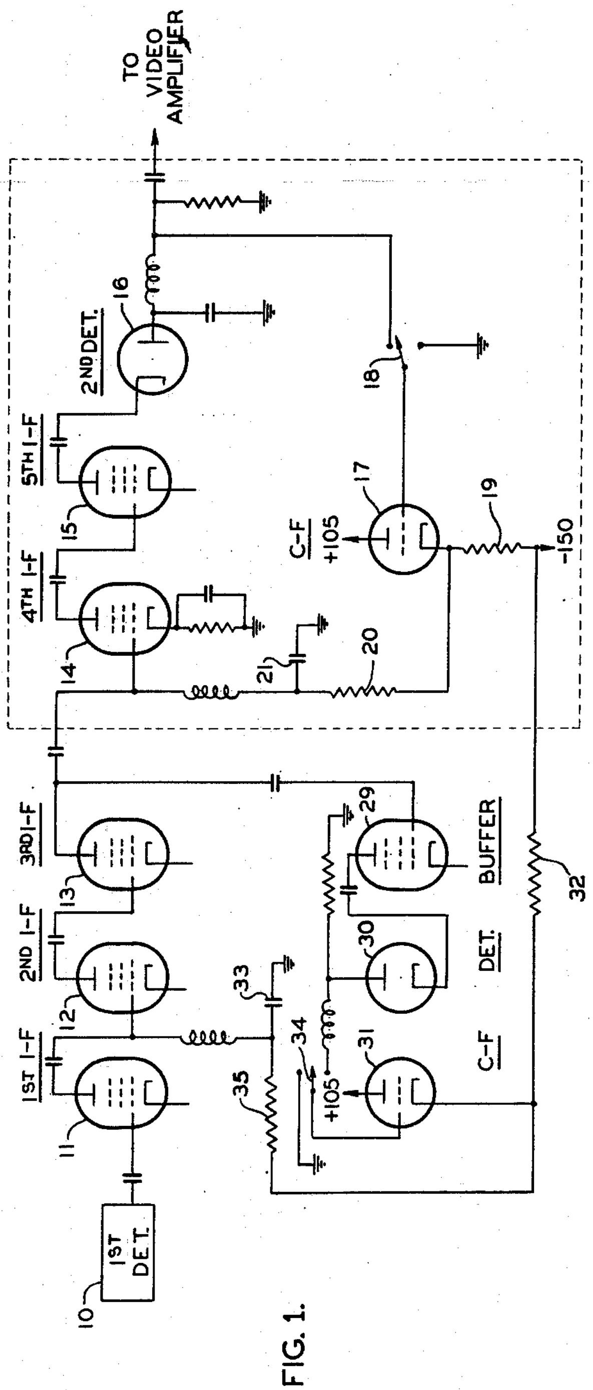
Figure 2:
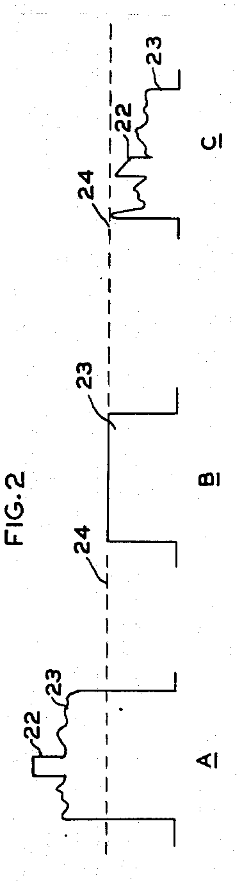

For a further understanding of this invention as well as other objects and novel features thereof, reference is had to the following detailed description to be read in connection with the accompanying drawings wherein:

Fig. 1 illustrates schematically the essential elements of a pulse-echo receiver incorporating a preferred embodiment of an automatic volume control in accordance with the invention; and Figs. 2A, 2B and 2C are diagrammatic representations of different forms of echo signals which would be passed by the receiver under various assumed conditions.

Referring now to the drawing and more particularly to Fig. 1, there is shown a circuit diagram of a portion of a conventional superheterodyne receiver employed in conjunction with a pulse-echo radio object-locating system. The output of the first detector stage 10 is impressed upon the first stage of a five-stage intermediate-frequency amplifier, each stage including a pentode tube as 11, 12, 13, 14 and 15, respectively. The output of the intermediate-frequency amplifier is fed to a second detector stage employing a diode 16, and the rectified signal derived therefrom is applied to a video amplifier and finally to an indicator, such as a cathode ray oscilloscope. For purposes of explanation, the receiver circuit has been simplified so as to include only those elements and connections relevant to the teaching of the present invention.

Referring now to Fig. 2A, there is shown the wave form of a signal such as may be received from a large group of ground objects in the vicinity of a reflecting target. In an ideal receiver having no saturation limit the wave form would not be altered by passing the signal through the receiver. Projection 22 indicates the reflection obtained from a target which combines in amplitude with the echo pulse 23 received from the other objects. The reflection area of these objects being greater than that of the target results in the base of the interfering echo signal being broader than that of the target echo signal. In this connection it will be understood that the present invention is concerned not only with ground, sea and cloud return but with other types of interfering signals as well, and hence the present disclosure should be construed broadly with this in mind.

Because of inherent tube characteristics, the response of the receiver is limited to a maximum value such as indicated by the dashed line 24, Fig. 2A. Consequently, if no automatic volume control is provided, the amplitude of the signal passed by the receiver is limited so that in the case of a strong interfering signal 23 having a relatively weak target signal as 22 superimposed upon it, the signal 22 is lost. The resulting signal represented in Fig. 2B, which is fed to the video amplifier produces a broad "smear" on the indicator which gives no indication of the specific target location.

Conventional automatic volume control circuits are designed to reduce the gain of an associated amplifier when a strong signal is received. Such operation would not be satisfactory in the present situation, however, because the amplification of the target signal 22 would be affected as well as that of the interfering signal 23 and it would be difficult, if not impossible, to distinguish between the two signals on the indicator.

Reference is made to "Standards on Transmitters," published by the Institute of Radio Engineers in 1948, where "cathode follower" is defined on page 12 as follows: "A circuit in which the output load is connected to the cathode circuit of an electron tube and the input is applied between the control grid and the remote end of the cathode load. The circuit is characterized by low output impedance, high input impedance, and gain less than unity." The term "cathode follower" as used in the specification and claims is to be construed in accordance with this definition.

It is the purpose of this invention to control the volume of the receiver in response to echo signals in a manner whereby the indicator associated therewith is enabled to show a distinction between target signals and other object reflections. In its most elementary form, the invention involves feeding back a portion of the signal from the second detector to the fourth intermediate-frequency stage through a cathode follower and an associated resistance-capacity network, as can be seen from the section of Fig. 1 that is inclosed by the dashed line. The cathode follower includes a triode tube 17 whose grid is connected to the output of the second detector through a single-pole, double-throw switch 18 permitting the insertion or removal of the automatic volume control.

The incoming IF signal is rectified by diode detector 16 thereby applying a negative-going pulse to the grid of triode 17 and decreasing the current flow through the triode 17. This enables condenser 21 to charge in a negative direction through resistor 19, thus applying, through filter resistor 20, a negative pulse on the grid of pentode 14.

In conventional automatic volume control circuits the controlled amplifier is of such character that an increase in the negative AVC bias serves to reduce the gain of the amplifier in a plurality of stages. The present invention, however, is designed with a view to retaining full amplification of the useful portion of the signal envelope while reducing or eliminating the interfering component of the signal. Hence, in the present instance, it is preferred to apply the feedback bias to a single stage using a sharp cut-off amplifier in order that the operation of the AVC circuit will produce an effect such as diagrammatically shown in Fig. 2C. Thus, a sufficient portion of the interfering signal 23 is displaced below the cut-off level so that the device functions to prevent overload of the IF amplifier due to strong interfering signals, while at the same time enabling normal amplification of the desired target signal 22 to take place below the level of maximum receiver response indicated by the dashed line 24. Rapid operation of the feedback loop is insured by making the time constant of the resistance-capacitance combination in the cathode circuit of tube 17 of longer duration than the target signal but relatively small with respect to the duration of the pulse resulting from the detection of the interfering echo signal.

The present invention is of further advantage in that it has a rapid action which enables it to follow fluctuations in the amplitude of the interfering signal. This feature is also useful in navigation inasmuch as the gain control of the set may be turned up sufficiently far so that distant signals may be seen while retaining a satisfactory picture of the signals nearby, even in cases of sea return.

At the conclusion of the signal pulse the grid of tube 17 becomes more positive, thereby increasing the conductivity of this tube and lowering the resistance of the discharge path for the condenser 21, resulting in an extremely short recovery time. It will be appreciated, therefore, that the provision of a cathode follower or other non-linear impedance in the feedback loop enables the AVC recovery time to be relatively independent of the operating time.

Because the above-described automatic volume control system protects only the last two intermediate-frequency stages from blocking, there is shown in Fig. 1 an extension of the principle consisting of an additional volume control feedback loop from the output of the third intermediate-frequency stage to the input circuit of the second intermediate-frequency stage. This hook-up affords blocking protection for two additional stages and the receiver is likewise given greater protection from undesirable signals. The output of the amplifier tube 13 is fed to the grid of a buffer stage employing a pentode 29. The output of pentode 29 is rectified by a diode detector 30 and then applied to the grid of a cathode follower 31 through a single-pole, double-throw switch 34. The cathode follower 31 delivers its output to a resistance-capacitance network comprising resistor 35 and condenser 33 whereby a bias control pulse is injected into the grid circuit of the amplifier tube 12. The behavior of this feedback loop is substantially identical with that previously described.

In practice, the circuit constants are made such that bias correction may be effected in one to five microseconds. The invention can readily be installed in microwave pulse receivers to greatly improve the detail in the indicator display.

While there has been described what is at present considered a preferred embodiment of the invention, it will be obvious to those skilled in the art that various changes and modifications may be made therein without departing from the invention, and therefore it is aimed in the appended claims to cover all such changes and modifications as fall within the true spirit and scope of the invention.

What is claimed is:

1. In a superheterodyne receiver including a plurality of intermediate-frequency stages and a second detector; a control circuit for preventing interfering signals from obscuring a target echo signal, comprising: a source of direct current voltage of low impedance to alternating current and having a positive terminal and a negative terminal, a first cathode follower including a first electron tube having an anode, a cathode and a control electrode, a first resistance connecting said cathode to said negative terminal, first means of negligible impedance connecting said anode to said positive terminal, and means for applying an output voltage from said second detector between said control electrode and said negative terminal; a first resistance-capacity network having a time constant of longer duration than said target signal but relatively small with respect to the duration of said interfering signal, said first resistance-capacity network being connected across said first resistance, means for applying feedback bias voltage from said network to the input circuit of a given one of said plurality of intermediate-frequency stages; a second cathode follower including a second electron tube having an anode, a cathode and a control electrode, a second resistance connecting said cathode of said second electron tube to said negative terminal, and second means of negligible impedance connecting said anode of said second electron tube to said positive terminal; means for rectifying the output of another of said intermediate-frequency stages preceding said given intermediate-frequency stage; and means for applying said rectified output between the control electrode of said second electron tube and said negative terminal; a second resistance-capacity network having a charging time constant equal to the first time constant, said second resistance-capacity network being connected across said second resistance; and means for applying feedback bias voltage from said second network to the input circuit of an intermediate- frequency stage of said receiver preceding said other intermediate-frequency stage.

2. In a superheterodyne radio receiver including an intermediate-frequency amplifier having relatively sharp cut-off and substantially linear gain throughout the normal range of signal amplitude; a control circuit for preventing interfering signals from obscuring target echo signals, comprising: a source of direct current voltage of low impedance to alternating current and having a positive terminal and a negative terminal, a cathode follower including an electron tube having an anode, a cathode and control electrode, a resistance connecting said cathode to said negative terminal, means of negligible impedance connecting said anode to said positive terminal, and means for applying detected signals between said control electrode and said negative terminal; a resistance-capacity network having a time constant of longer duration than said target signal but relatively small with respect to the duration of said interfering signal, said network being connected across said resistance of said cathode follower; and means for applying feedback bias voltage from said network to said intermediate-frequency amplifier.

3. In a receiver including a carrier-frequency amplifier, a circuit for controlling the gain of said carrier-frequency amplifier, comprising: means for rectifying the carrier-frequency signal appearing at a given point in said amplifier; a source of direct current voltage of low impedance to alternating current and having a positive and a negative terminal; a cathode follower including an electron tube having at least an anode, a cathode and a control electrode, a resistance connecting said cathode to said negative terminal, means of negligible impedance connecting said anode to said positive terminal, and means for applying said rectified signal between said control electrode and said negative terminal; an integrating network; means for applying the output across said resistance directly to said integrating network, and means for applying the output of said integrating network as a bias to a point in said amplifier preceding said given point to reduce the gain of said amplifier between said point and said given point.

4. A circuit according to claim 3, wherein said integrating circuit comprises a serially-connected resistance and capacitance and wherein the output of said integrating circuit is taken from across said capacitance.

5. A circuit according to claim 3, wherein said given point is at the output of said amplifier, and further including means for applying said rectified signal to a utilization means.

PERSA R. BELL, Jr.

References Cited in the file of this patent

UNITED STATES PATENTS

| Number | Name | Date |
|---|---|---|
| 1,933,148 | Perkins | Oct. 31, 1933 |
| 2,088,230 | Burnside | July 27, 1937 |
| 2,129,028 | Roberts | Sept. 6, 1938 |
| 2,135,560 | Carlson | Nov. 8, 1938 |
| 2,145,333 | Beers | Jan. 31, 1939 |
| 2,159,803 | Klotz | May 23, 1939 |
| 2,185,612 | Trevor | Jan. 2, 1940 |
| 2,204,973 | Steinmetz | June 18, 1940 |
| 2,207,094 | Getaz | July 9, 1940 |
| 2,224,134 | Blumlein | Dec. 10, 1940 |
| 2,226,259 | Richards et al. | Dec. 24, 1940 |
| 2,227,492 | Faudell et al. | Jan. 7, 1941 |
| 2,236,497 | Beers | Apr. 1, 1941 |
| 2,240,600 | Applegarth, Jr. | May 6, 1941 |
| 2,241,553 | Kallmann et al. | May 13, 1941 |
| 2,247,468 | Barr et al. | July 1, 1941 |
| 2,249,323 | Mitchell | July 15, 1941 |
| 2,253,450 | Travis | Aug. 19, 1941 |
| 2,269,249 | Bruck | Jan. 6, 1942 |
| 2,273,096 | Foster | Feb. 17, 1942 |
| 2,286,337 | Bruck | June 16, 1942 |
| 2,329,570 | Wellenstein | Sept. 13, 1943 |
| 2,337,196 | Hollingsworth | Dec. 21, 1943 |
| 2,427,691 | Pritchard | Sept. 23, 1947 |

FOREIGN PATENTS

| Number | Country | Date |
|---|---|---|
| 445,030 | Great Britain | Mar. 30, 1936 |